US006324610B1

(12) United States Patent
Lord et al.

(10) Patent No.: US 6,324,610 B1
(45) Date of Patent: Nov. 27, 2001

(54) SHARED MULTI-PORT COMMUNICATIONS DEVICE AND ASSOCIATED METHODS

(75) Inventors: Randal B. Lord; Robert M. Scharf, both of Melbourne, FL (US)

(73) Assignee: Stratos Lightwave, Inc., Chicago, IL (US)

( * ) Notice: Subject to any disclaimer, the term of this patent is extended or adjusted under 35 U.S.C. 154(b) by 0 days.

(21) Appl. No.: 09/333,334

(22) Filed: Jun. 15, 1999

Related U.S. Application Data

(63) Continuation of application No. 09/137,407, filed on Aug. 20, 1998, which is a continuation of application No. 09/098,277, filed on Jun. 16, 1998.

(51) Int. Cl.[7] .......... G06F 13/14

(52) U.S. Cl. .......... 710/126; 710/131; 361/788; 361/759

(58) Field of Search .......... 710/126, 131; 361/788, 759

(56) References Cited

U.S. PATENT DOCUMENTS

| | | | | |
|---|---|---|---|---|
| 4,973,799 | * | 11/1990 | Soma et al. | 174/260 |
| 5,280,598 | * | 1/1994 | Osaki et al. | 710/127 |
| 5,518,423 | | 5/1996 | Green et al. | 439/610 |
| 5,647,767 | | 7/1997 | Scheer et al. | 439/620 |
| 5,650,917 | * | 7/1997 | Hsu | 361/759 |
| 5,841,633 | * | 11/1998 | Huang | 361/695 |
| 5,949,648 | * | 9/1999 | Liao | 361/700 |
| 5,969,946 | * | 10/1999 | Lai et al. | 361/704 |
| 5,982,634 | * | 11/1999 | Wronski | 361/788 |
| 5,986,693 | * | 11/1999 | Adair et al. | 348/76 |
| 5,991,837 | * | 11/1999 | Cronin et al. | 710/100 |
| 6,061,238 | * | 5/2000 | Osakada et al. | 361/703 |
| 6,094,344 | * | 7/2000 | Nakagawa et al. | 361/687 |
| 6,115,755 | * | 9/2000 | Krishan | 709/250 |

OTHER PUBLICATIONS

Product Sheet MD6304 Series, "Quad 10/100BASE–TX Filtered Connector Module", *Valor Electronics, Inc.*, 1997.
Product Sheet MD6301 Series, "Single 10/100BASE–TX Filtered Connector Module", *Valor Electronics, Inc.*, 1997.
Data Sheet LXT915, "Simple Quad Ethernet Repeater", *Level One*, (4/97), pp. 1–21.

* cited by examiner

*Primary Examiner*—Thomas Lee
*Assistant Examiner*—Abdelmoniem Elamin
(74) *Attorney, Agent, or Firm*—Steven M. Evans

(57) ABSTRACT

A shared communications device includes a multi-port jack housing having portions defining a plurality of recesses extending inwardly from the front for receiving respective mating plugs. Signal connectors are preferably positioned within each of the recesses and define respective communications ports. A circuit board is positioned within the multi-port jack housing and preferably extends adjacent the back. The shared communications device preferably includes at least one shared communications processor mounted on the circuit board and connected to the plurality of communications ports for processing inbound and outbound communications signals so that the signals are shared among the communications ports. A shared communications processor preferably communicates with two or more of the communications ports. In embodiments including a plurality of shared communications processors, a communications repeater bus is provided on the circuit board interconnecting the shared communications processors. The signal connectors may be electrical and/or optical, and may be compatible with an RJ-45 jack. An internal EMI shield may be provided in the circuit board.

62 Claims, 6 Drawing Sheets

SHARED MULTI-PORT COMMUNICATIONS DEVICE AND ASSOCIATED METHODS

RELATED APPLICATION

The present application is a continuation of U.S. pending patent application Ser. No. 09/137,407 filed Aug. 20, 1998 which, in turn, is a continuation-in-part of U.S. pending patent application Ser. No. 09/098,277 filed Jun. 16, 1998.

FIELD OF THE INVENTION

The present invention relates to the field of communications electronics, and, more particularly, to a shared communications device and related methods.

BACKGROUND OF THE INVENTION

Digital communications over twisted copper wire pairs, or optical fiber pairs, are widely used for Local Area Networks (LANs), for example. The LAN typically connects multiple computer users to a server or other computer. A LAN transceiver, that is, a combination transmitter and receiver, is typically used to transmit data and receive data over the twisted pair or fiber pair.

A typical LAN 15 as in the prior art is shown

A typical LAN 15 as in the prior art is shown in FIG. 1. The LAN 15 includes a pair of servers 16 connected to a plurality of user workstations 21. A hub 17 is connected on one side to the servers 16, and on the other side to the workstations 21. The hub 17 includes signal ,transceivers and associated circuitry for processing the signals between the servers 16 and workstations 21.

A simplified prior art hub 17 with the overall housing removed for clarity is shown in FIG. 2. More particularly, the illustrated hub 17 includes a modular jack connector 22, which, in turn, may provide twelve ports 22*a* for connection to up to twelve workstations 21. A series of electrical conductors, not shown, are carried within each recess of the modular jack connector 22 and engage mating conductors on the corresponding jack or plug. One common port arrangement provides compatibility with a so-called "RJ-45" jack.

Optical ports, such as including an optical detector and optical emitter, are also commonly used to establish inbound and outbound signal paths.

The modular jack connector 22 is mounted onto a mother circuit board 24. The mother circuit board 24 also illustratively mounts three communications processors 26, such as may be provided by available integrated circuit packages. In addition, the mother board 24 illustratively mounts associated magnetic devices 27 for coupling to twisted wire pairs, for example. The magnetic devices 27 are typically small transformers.

The communications processor IC's 26 may be integrated quad-port repeaters such as the Model LXT915 available from Level One of Sacramento, Calif. Each of the communications processors 26 includes four transceivers for connection to four respective ports 22*a*. The communications processor IC's establish shared communications among the connected ports.

The mother circuit board 24 would also typically mount a number of other components, not shown, such as for supplying power, providing various status indications, etc. An overall housing, not shown, would also typically be provided to protect the mother board 24 and other components. The hub 17 is typically a relatively bulky and expensive piece of equipment.

Board-mounted shielding would typically be needed to shield the communications processors 26 from the magnetic devices 27. The magnetic devices 27 typically generate electromagnetic interference (EMI), and the communications processors 26 are typically susceptible to EMI. The housing may be made of an electrical conductor, to provide an overall EMI shield.

Another disadvantage of prior art LANs including one or more conventional hubs 17, is that the hubs are separate pieces of equipment from the servers 16. The hubs 17 need to be purchased, installed and maintained. In other words, the hubs 17 add cost and complexity, and may reduce the overall reliability of the LAN 15.

SUMMARY OF THE INVENTION

In view of the foregoing background, it is therefore an object of the present invention to provide a shared communications device and associated method wherein the functions of a conventional hub can be provided in a more compact and convenient device, such as to be integrated in another device, to thereby reduce cost and increase reliability.

It is another object of the invention to provide such a shared communications device and associated method which is also resistant to EMI and which can be readily compatible with existing RJ-45 jacks and plugs.

These and other objects, features and advantages in accordance with the present invention are provided by a shared communications device comprising, in one embodiment, a multi-port jack housing having a front and a back, and including portions defining a plurality of recesses extending inwardly from the front for receiving respective mating plugs therein. Signal connector means are preferably positioned within each of the recesses and define a respective plurality of communications ports. Of course, each communications port establishes inbound and outbound signal paths with a respective mating plug. A circuit board is positioned within the multi-port jack housing and preferably extends adjacent the back thereof.

In addition, the shared communications device preferably includes at least one shared communications processor mounted on the circuit board and connected to the plurality of communications ports for processing inbound and outbound communications signals so that the signals are shared among the communications ports. In other words, the at least one shared communications processor preferably communicates with two or more of the communications ports in a shared fashion so that signals appear at the connected communications ports. Accordingly, an extremely compact shared communications multi-port device is provided.

In some embodiments, the at least one shared communications processor comprises a plurality of shared communications processors. In these embodiments, a communications repeater bus is provided on the circuit board interconnecting the plurality of shared communications processors. The shared communications processors include means for communicating with each other over this repeater bus.

Two or more of the plurality of recesses may be positioned in side-by-side relation. In one particularly advantageous embodiment, the recesses are arranged in two tiers, with each tier comprising two or more recesses arranged in side-by-side relation. In addition, a respective shared communication processor may be provided for each group of four communications ports. Each shared communications processor preferably includes an integrated circuit. Each shared communications processor also preferably includes a plurality of transceivers for a corresponding group of communications ports.

Another important aspect of the invention relates to shielding. More particularly, the circuit board preferably comprises an electrically conductive layer defining a first internal electromagnetic interference (EMI) shield. In embodiments wherein a plurality of shared communications processors are used, these are all preferably positioned on a first side of the circuit board. Moreover, EMI generating devices, such as circuit magnetics, are preferably positioned on the second side of the circuit board. Accordingly, a compact arrangement is facilitated without compromising performance caused by EMI.

Also relating to EMI, the shared communications device may preferably include an electrically conductive layer on outer surface portions of the multi-port jack housing defining an external EMI shield. This external EMI shield may be connected to the internal EMI shield.

There is a large installed base of existing communications ports and equipment compatible with the RJ-45 jack. Accordingly, in the shared communications device according to the invention each of the communications ports is preferably compatible with the RJ-45 jack.

The signal connector means may comprise a plurality of electrical contacts, such as for twisted pair links. Alternately, the signal connector means may be optical and comprise an optical detector for inbound optical signals, and an optical emitter for outbound optical signals. Mixes of both formats may be provided in the communications device.

Another aspect of the invention relates to a method for making a shared communications device comprising a multi-port jack housing having a front and a back, and including portions defining a plurality of recesses extending inwardly from the front for receiving respective mating plugs therein. The method preferably comprises the steps of: positioning signal connector means within each of the recesses and defining a respective plurality of communications ports, each communications port for establishing inbound and outbound signal paths with a respective mating plug; mounting at least one shared communications processor on a circuit board and connected to the plurality of communications ports for processing inbound and outbound communications signals so that signals are shared among the ports; and positioning the circuit board within the multi-port jack housing and extending adjacent the back thereof.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. Prime and double prime notation is used to indicate similar elements in alternate embodiments.

Figure 1:
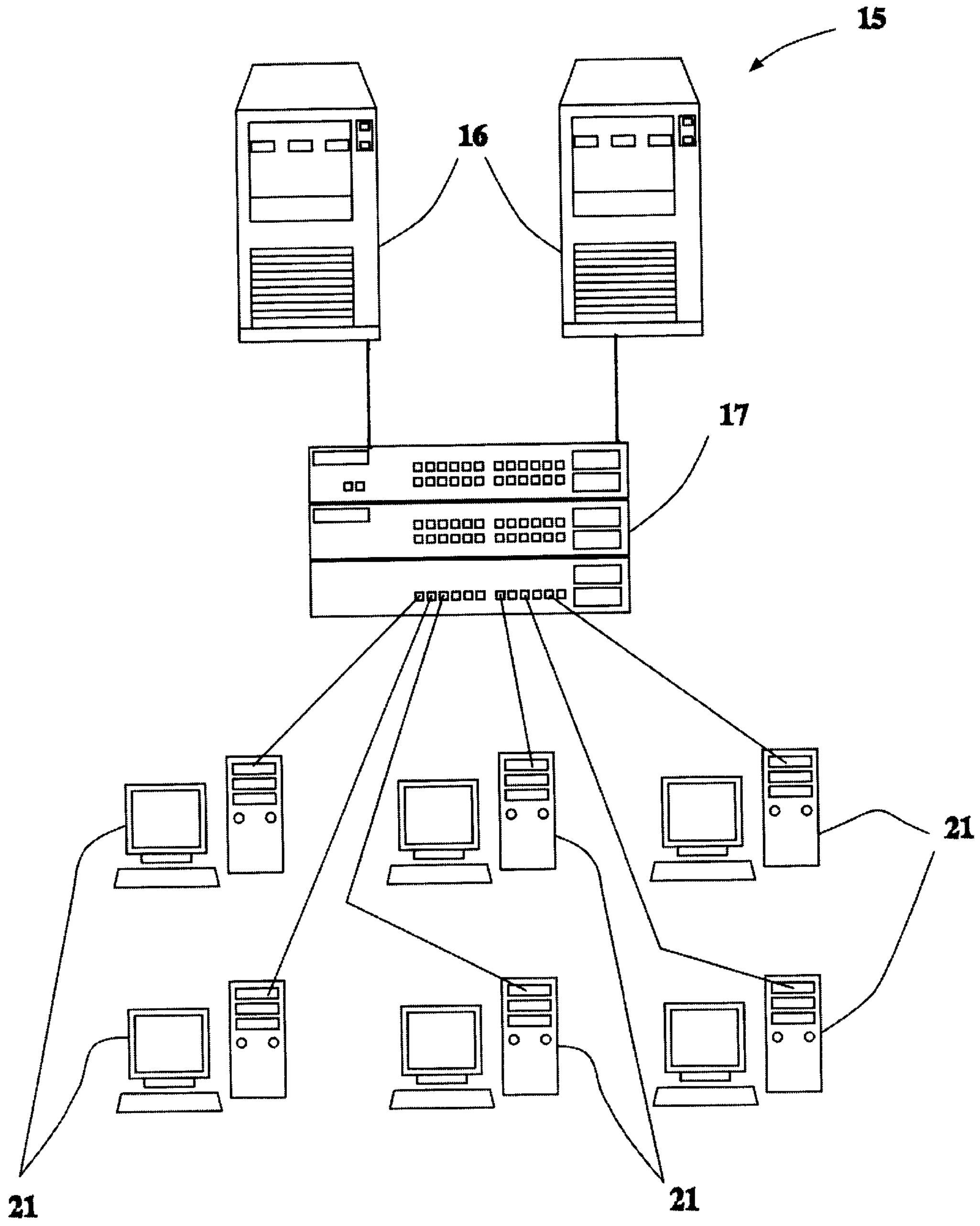
Fig. 1 (PRIOR ART)
FIG. 1 is a schematic diagram of a typical LAN as in the prior art.
Figure 2:
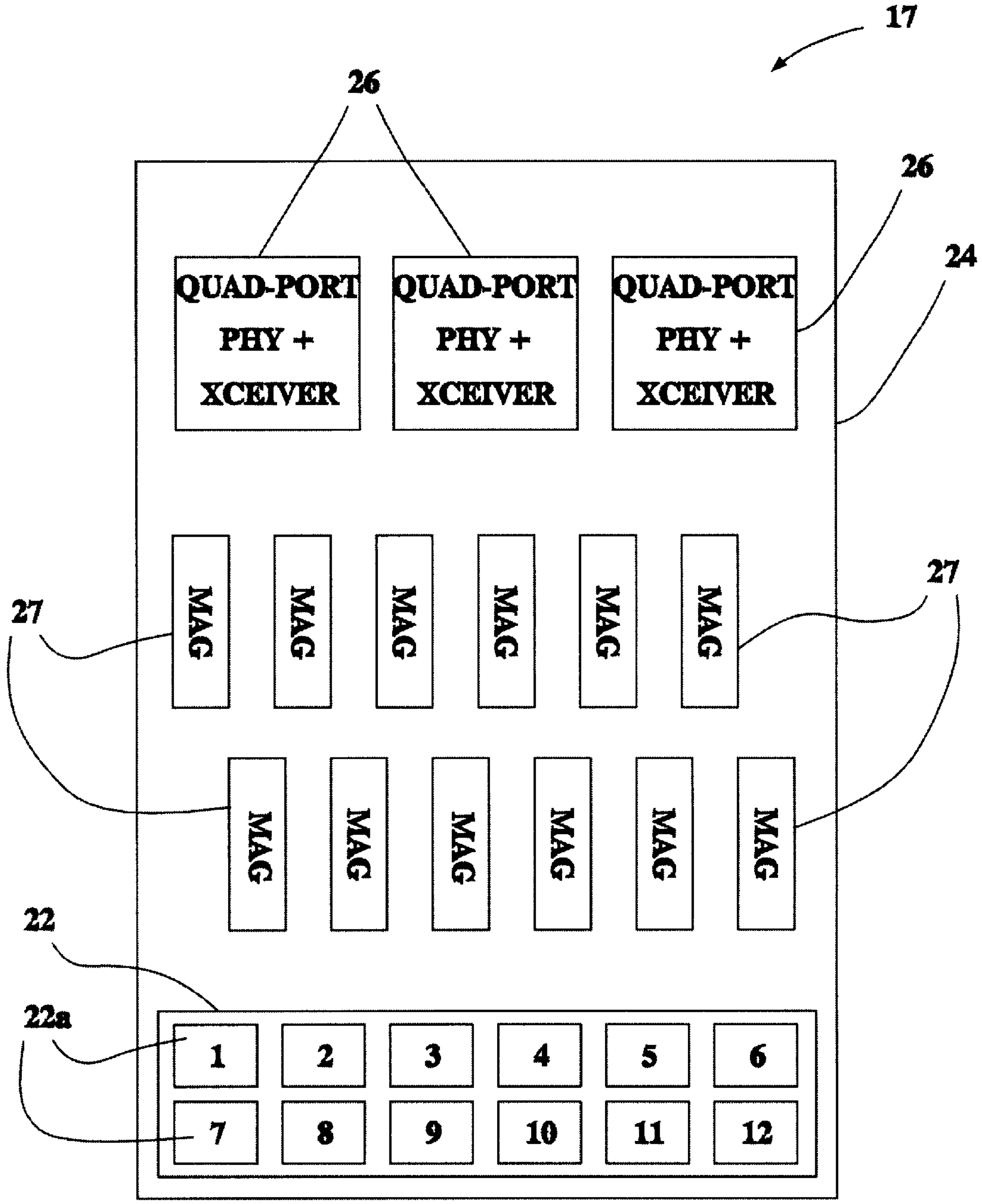
Fig. 2 (PRIOR ART)
FIG. 2 is a schematic plan view of a mother circuit board and related components mounted thereon in a hub as in the prior art and used in the LAN of FIG. 1.
Figure 3:
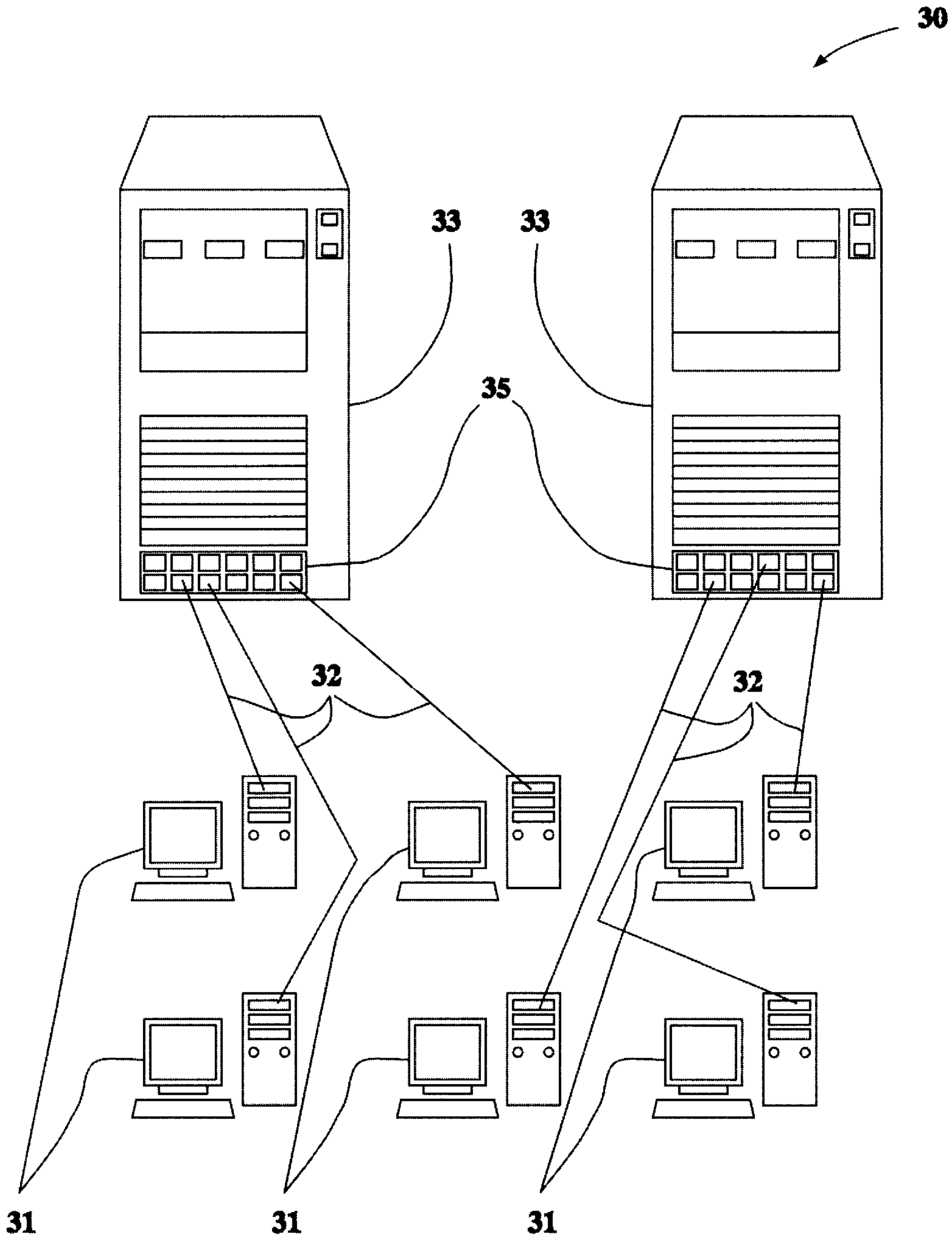
FIG. 3 is a schematic diagram of a LAN including a server equipped with a shared communications device in accordance with the present invention
Figure 4:
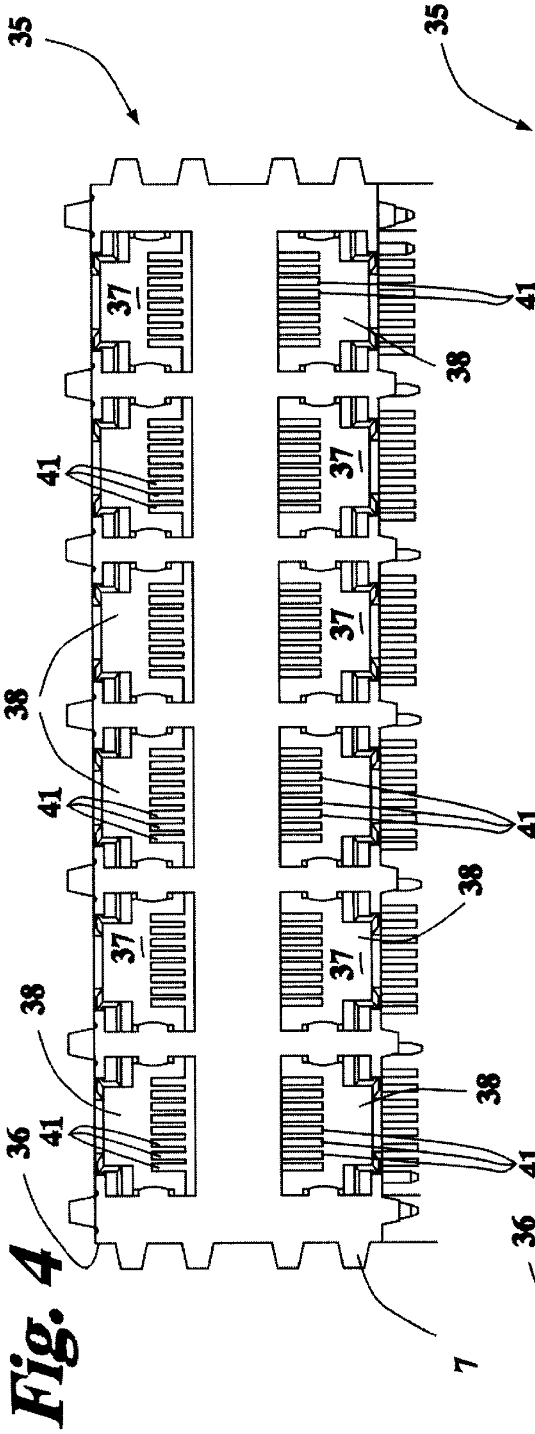
FIG. 4 is a front view of the shared communications device as shown in FIG. 3.

Referring initially to FIGS. 3–7, a first embodiment of a shared communications device 35 in accordance with the invention will now be described. As shown in FIG. 3, the shared communications device 35 may advantageously be incorporated into a server 33, which, in turn, is part of a LAN 30. As shown in the illustrated embodiment, the LAN 30 interconnects a plurality of user workstations 31.

Twisted pair lines 32 may connect the workstations 31 to the respective ports of the respective shared communications devices 35. Of course, as will be readily appreciated by those skilled in the art, fiber cables may be used to connect the workstations, or a mixture of fiber and twisted pair lines may be used.

In addition, although the shared communications device 35 is shown incorporated into a server 33, it may also be advantageously incorporated in other computer devices. The shared communications device 35 may be used, for example, in an integrated cable TV modem and Ethernet hub, as will also be readily appreciated by those skilled in the art. Other applications are also contemplated by the invention.

The shared communications device 35 includes multi-port jack housing 36 having a front and a back, and including portions defining a plurality of recesses 37 extending inwardly from the front for receiving respective mating plugs, not shown. The multi-port jack housing 36 may be integrally molded plastic, for example, as will be readily understood by those skilled in the art. In the illustrated embodiment, six recesses 37 are positioned in side-by-side relation, and two tiers of such recesses are provided. Any number of recesses 37 may be provided as explained in greater detail below. The illustrated twelve-port arrangement provides a relatively compact, yet readily manufactured embodiment of the shared communications device 35. This arrangement provides a relatively high port density and is also define a respective plurality of communications ports 38. In the illustrated embodiment, a plurality of biased electrical contacts 41 are provided. The arrangement of the contacts 41 and the size and configuration of the recesses 37 are compatible with the ubiquitous RJ-45 jack, which is commonly used in LAN and other communications applications as will be readily understood by those skilled in the art. Other configurations of electrical contacts are also contemplated by the present invention. Each communications port 38 establishes inbound and outbound signal paths with a respective mating plug.

Figure 5:
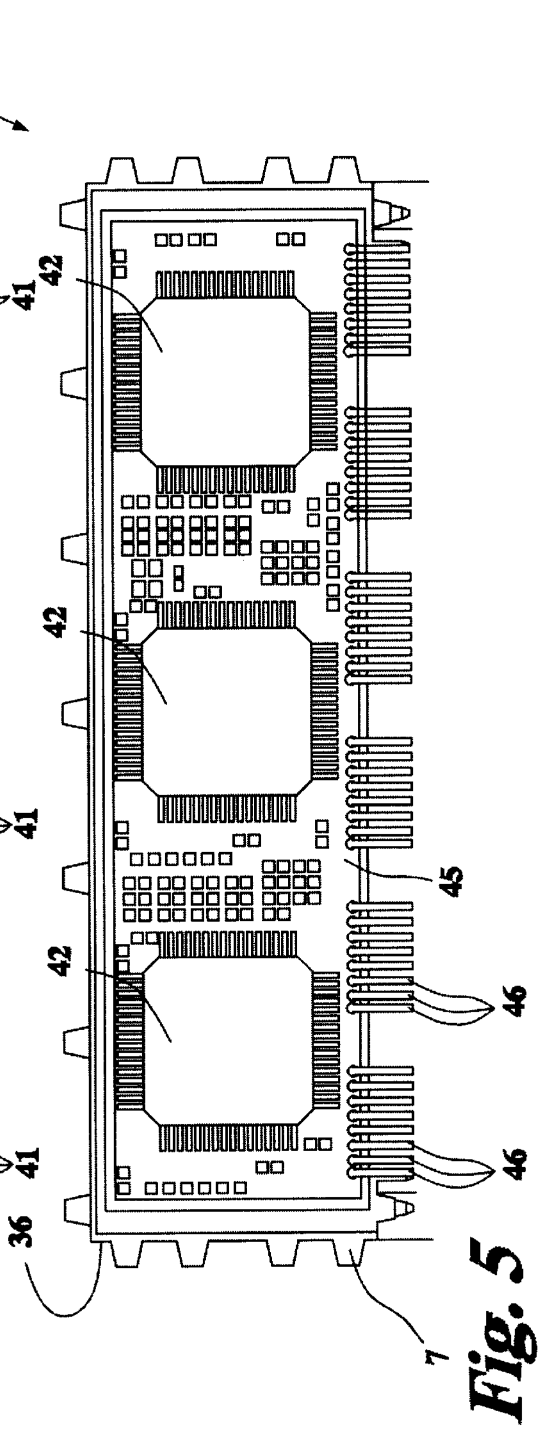
FIG. 5 is a rear view of the shared communications device as shown in FIG. 3, with the rear housing portion removed.

A relatively compact circuit board 45 is illustratively positioned within the multi-port jack housing 36 and extends across the entire back thereof as shown best in FIG. 5. Moreover, the shared communications device 35 includes three shared communications processors 42 mounted on the circuit board and connected to the plurality of communications ports 38 for processing inbound and outbound communications signals so that the signals are shared among the ports. Each shared communications processor 42 communicates with four communications ports 38 in the illustrated embodiment. In other embodiments, other numbers of ports 38 can be handled by each processor. Accordingly, an extremely compact multi-port device is provided.

Each shared communications processor 42 may be provided, for example, by a commercially available integrated circuit offered by Level One under the is provided.

Each shared communications processor 42 may be provided, for example, by a commercially available integrated circuit offered by Level One under the designation LXT915. The shared communications processor 42 includes a plurality of transceivers for a corresponding group of communications ports 38. In the past, such ICs were positioned on relatively large and bulky mother boards as part of a hub as described above in the Background of the Invention section. In accordance with the present invention, the considerable signal processing capability of the IC is provided within the compact multi-port housing 36. Accordingly, the shared communications device 35 may be connected to a mother circuit board, such as of the server 33 (FIG. 3), or other similar computer device. A separate hub may then not be needed. Thus, the initial purchase cost, and maintenance costs may be less. In addition, the LAN 30 will be simpler and more robust.

Although the shared communications processors 42 are shown as integrated circuit packages, that is, with an integrally molded layer and outwardly extending leads, the processors may also be provided by the individual circuit die without the package. In other words, the circuit board 45 may mount the individual integrated circuit die as will be readily appreciated by those skilled in the art. Mounting the individual circuit die requires considerable less surface area on the circuit board 45, which is necessarily relatively limited because of the compact dimensions of the multi-port housing 36 to be compatible with the RJ-45 jacks.

A plurality of pins 46 extend outwardly from the bottom edge of the circuit board 45 as shown in FIG. 5. These pins 46 can be inserted into corresponding openings in a circuit board to which the shared communications device 35 is attached, such as the mother board of the server.

The shared communications device 35 also illustratively includes a metal or other conductive layer 47 which covers the outer surface portions of the multi-port housing 36 to thereby provide an EMI shield. Accordingly, adjacent components will not interfere with the circuitry within the housing 36, and conversely, EMI will not be radiated outwardly from the housing. As would be readily understood by those skilled in the art, a back panel covers the circuit board 45. In addition, the outer EMI shield 47 would also include portions which cover the back panel.

Figure 6:
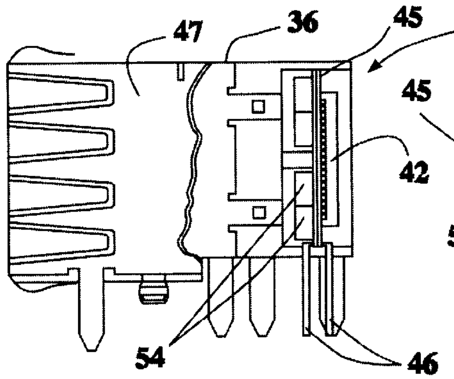
FIG. 6 is a fragmentary side view of the shared communications device as shown in FIG. 3.
Figure 7:
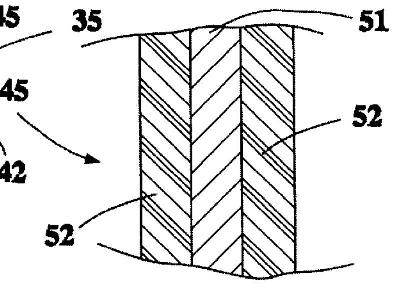
FIG. 7 is a greatly enlarged cross-sectional view of the circuit board in the shared communication device as shown in FIG. 3.

Referring now more particularly to FIGS. 6 and 7, another important aspect of the present invention relates to internal EMI shielding. The circuit board 45 illustratively comprises an electrically conductive layer 51 between two dielectric layers 52. Of course, the circuit board 45 may also include other layers as will be appreciated by those skilled in the art. The electrically conductive layer 51 defines an internal electromagnetic interference (EMI) shield. The electrically conductive layer 47 which defines the external EMI shield may be connected to the electrically conductive layer 51 which defines the internal EMI shield. In embodiments including a plurality of shared communications processors 42, these are all preferably positioned on a first side of the circuit board 45. In the illustrated embodiment, the processors 42 are positioned adjacent the back of the multi-port housing 36. The position could be reversed in other embodiments.

EMI generating devices, such as the illustrated circuit magnetics 54, are positioned on the second side of the circuit board 45. In embodiments of the shared communications device 35 including only a single communications processor 42, the magnetics 54 or other EMI generating devices are preferably on the opposite side from the processor. Accordingly, a compact arrangement is facilitated without compromising performance caused by EMI.

Figure 8:
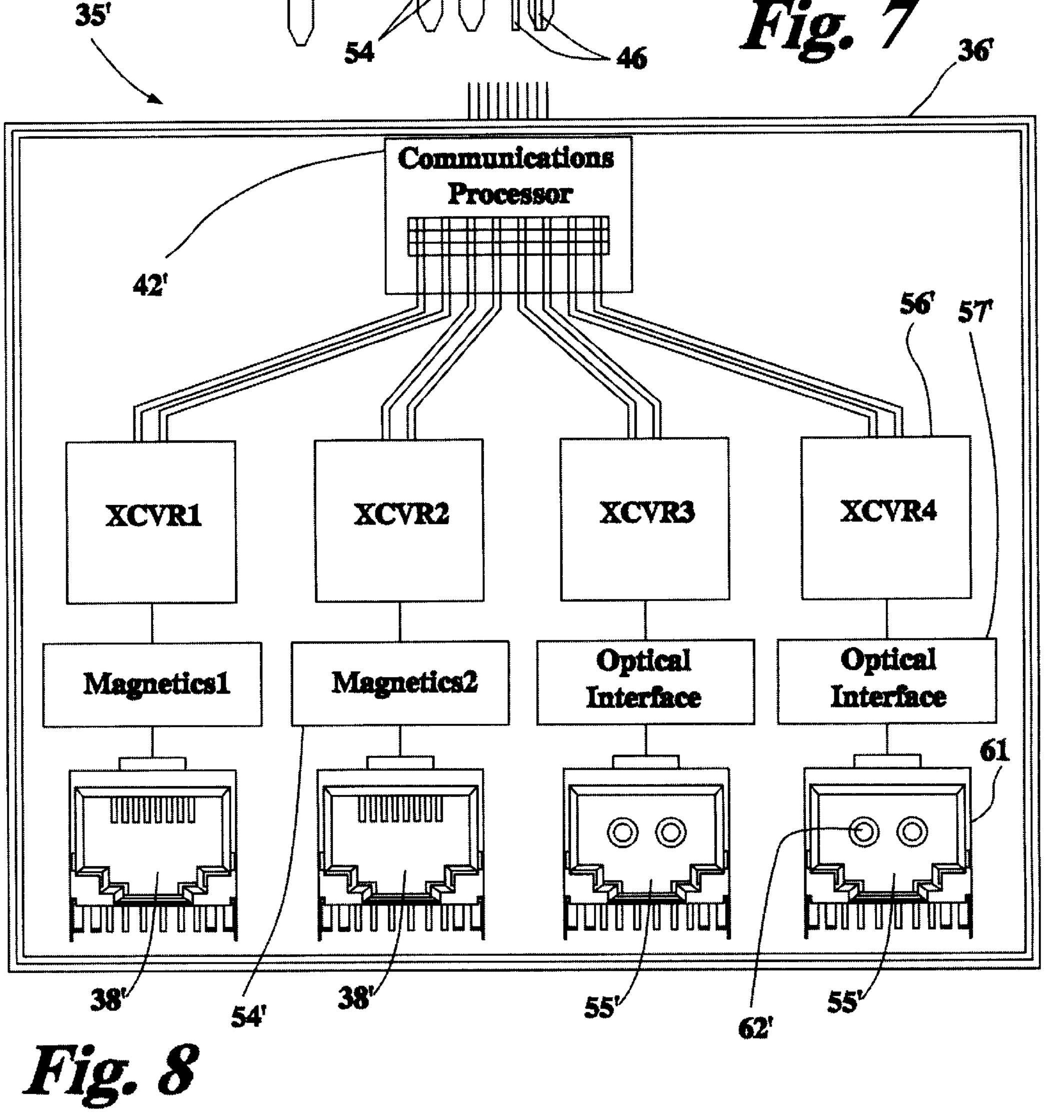
FIG. 8 is a schematic diagram of a second embodiment of the shared communications device in accordance with the present invention.

A second embodiment of the shared communications device 35' is schematically illustrated in FIG. 8. In this embodiment two twisted pair ports 38' are provided, and two optical ports 55' are provided. The shared communications processor 42' is connected to four transceivers 56'. In other embodiments, the transceivers 56' may be part of the integrated circuit of the processor. Magnetics 54' are provided for interfacing the twisted pair ports 38'. Optical interfaces 57' are provided for interfacing the transceivers 56' to the optical ports 55'.

Considering now in greater detail the optical ports 56', each such port includes an optical detector 61' for inbound optical signals and an optical emitter 62' for outbound optical signals. Considered in slightly different terms, the optical detector 61' and optical emitter 62' provide the signal connector means.

This second embodiment illustrates a mix of both optical and twisted pair ports, and those of skill in the art will recognize that the ports can also be all optical or all twisted pair, for example, in other embodiments. The optical detector 61' and optical emitter 62' may be provided by any of a number of commercially available devices as will be readily appreciated by those skilled in the art. The shared communications device 35' includes a multi-port housing 36', circuit board mounting arrangement, and EMI shields as described above with reference to the embodiment as shown in FIGS. 3–7.

Figure 9:
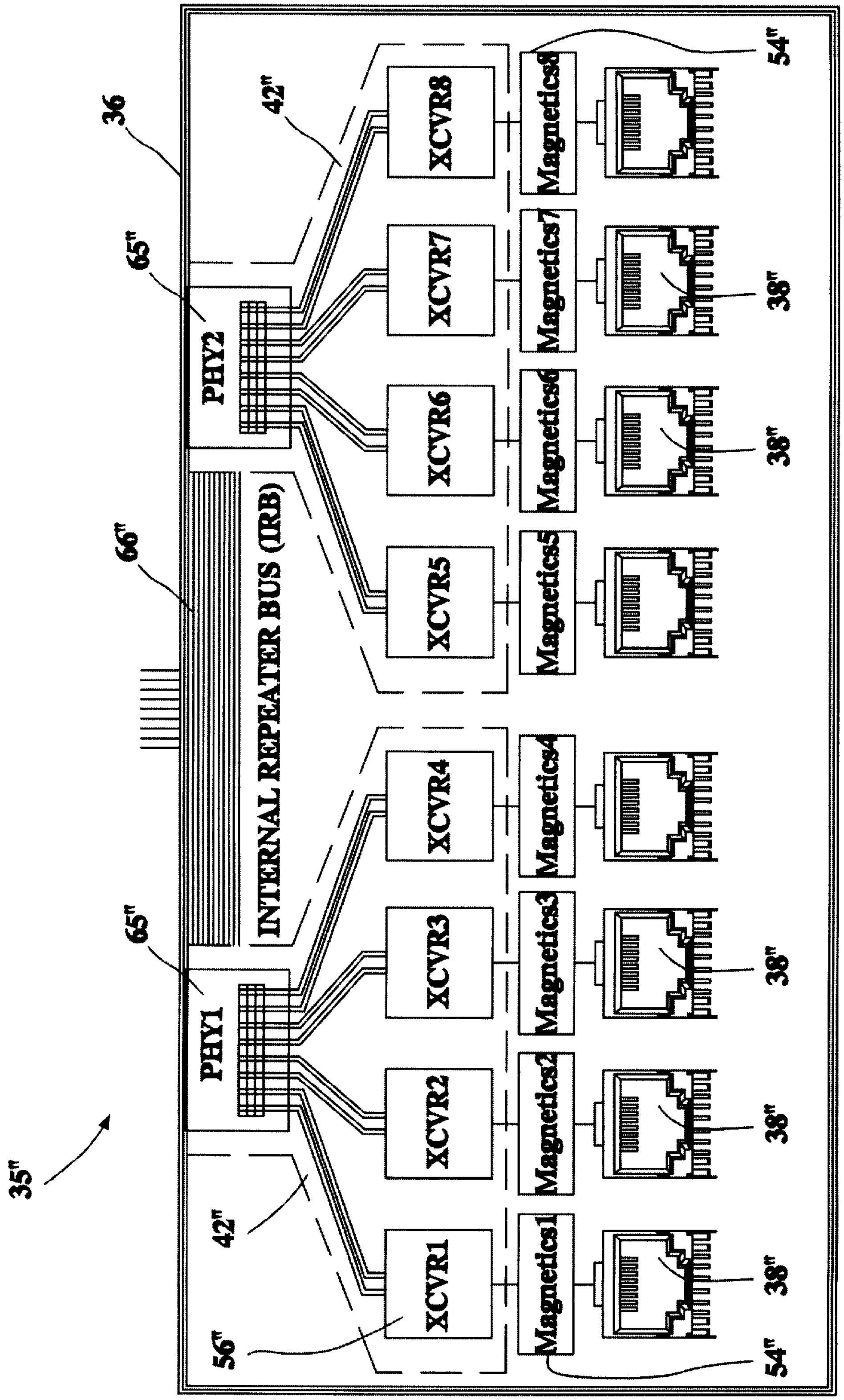
FIG. 9 is a schematic diagram of a third embodiment of a shared communications device in accordance with the present invention.

A third embodiment of the shared communications device 35" is explained with additional reference to FIG. 9. In this embodiment, two shared communications processors 42" are provided. In addition, an internal repeater bus 66" is provided for communications between the two processors 42". The internal repeater bus 66" is provided by appropriate traces on the circuit board, for example, as will be readily appreciated by those skilled in the art.

The shared communications processors 42" include circuitry for communicating with each other over this bus as will also be readily appreciated by those skilled in the art.

More particularly, each of the processors 42" is illustrated with transceiver circuitry 56" for each port, as well as PHY circuitry portions 65" for each group of four ports 38". The PHY circuitry portions 65" provide the so-called physical layer interface to the associated computer or other equipment.

The shared communications device 35" includes a multi-port housing 36", circuit board mounting arrangement, and EMI shields as described above with reference to the embodiment described above. The circuitry mounted within the compact multi-port housing 36" performs the following functions: encodes and serializes the outgoing data, decodes and deserializes the incoming data, and synchronizes data flowing to and from the ports to the system bus timing. In addition, all digital-to-analog conversion is accomplished for the outgoing signals, analog-to-digital conversion is performed for the incoming signals, the impedance to each line is matched, and isolation is provided against external over voltage/over current conditions. All of these functions are performed by the shared communications device 35" having the same or similar size as only the molded connector body of prior art hubs.

Another aspect of the invention relates to a method for making a shared communications device 35 comprising a multi-port jack housing 36 having a front and a back, and including portions defining a of the recesses 37 and defining a respective plurality of communications ports 38, each communications port for establishing inbound and outbound signal paths with a respective mating plug; mounting at least one shared communications processor 42 on a circuit board 45 and connected to the plurality of communications ports for processing inbound and outbound communications signals so that the signals are shared among the ports; and positioning the circuit board within the multi-port jack housing and extending adjacent the back thereof.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An RJ-jack housing, comprising:

a multi-port RJ-jack housing having a front and a back, and including portions defining a plurality of recesses extending inwardly from the front for receiving respective mating plugs therein;

signal connector means within each of the recesses and defining a respective plurality of communications ports, each communications port for establishing inbound and outbound signal paths with a respective mating plug;

a circuit board within said multi-port RJ-jack housing parallel and adjacent to the back of the housing; and at least one shared communications processor mounted on said circuit board and connected to said plurality of communications ports for processing inbound and outbound communications signals so that the signals are shared among the plurality of communications ports.

2. The RJ-jack housing according to claim 1 wherein said at least one shared communications processor comprises means for communicating with two or more of said communications ports.

3. The RJ-jack housing according to claim 1 wherein said at least one shared communications processor comprises a plurality of shared communications processors.

4. The RJ-jack housing according to claim 3 wherein each of said plurality of shared communications processors is connected to two or more of said communications ports.

5. The RJ-jack housing according to claim 3 further comprising a communications repeater bus on said circuit board interconnecting said plurality of shared communications processors.

6. The RJ-jack housing according to claim 1 wherein the plurality of recesses are arranged in two tiers, with each tier comprising two of more recesses arranged in side-by-side relation.

7. The RJ-jack housing according to claim 1 wherein the plurality of recesses are arranged in two tiers, with each tier comprising two or more recesses arranged in side-by-side relation.

8. The RJ-jack housing according to claim 1 wherein said at least one shared communications processor comprises a respective shared communication processor for each group of four communications ports.

9. The RJ-jack housing according to claim 1 wherein said at least one shared communications processor comprises an integrated circuit.

10. The RJ-jack housing according to claim 1 wherein said at least one shared communications processor comprises a plurality of transceivers for a corresponding group of communications ports.

11. The RJ-jack housing according to claim 1 wherein said circuit board comprises an electrically conductive layer defining a first internal electromagnetic interference (EMI) shield.

12. The RJ-jack housing according to claim 11 wherein said at least one shared communications processor comprises a plurality of shared communications processors all positioned on a first side of said circuit board.

13. The RJ-jack housing according to claim 11 further comprising an electrically conductive layer on outer surface portions of said multi-port RJ-jack housing defining an external EMI shield.

14. The RJ-jack housing according to claim 13 wherein said first internal EMI shield is electrically connected to said external EMI shield.

15. The RJ-jack housing according to claim 12 further comprising at least one EMI generating device positioned on a second side of said circuit board opposite the first side.

16. The RJ-jack housing according to claim 15 wherein said at least one EMI generating device comprises at least one magnetic device.

17. The RJ-jack housing according to claim 1 wherein each of said communications ports is compatible with an RJ-45 jack.

18. The RJ-jack housing according to claim 1 wherein said signal connector means comprises a plurality of electrical contacts.

19. The RJ-jack housing according to claim 1 wherein said signal connector means comprises:

an optical detector for inbound optical signals; and an optical emitter for outbound optical signals.

20. An RJ-jack housing, comprising:

a multi-port RJ-jack housing including portions defining a plurality of recesses extending inwardly for receiving respective mating plugs therein;

signal connector means within each of the recesses and defining a respective plurality of communications ports, each communications port for establishing inbound and outbound signal paths with a respective mating plug;

a circuit board within said multi-port RJ-jack housing, said circuit board comprising an electrically conductive layer defining a first internal electromagnetic interference (EMI) shields and said circuit board being parallel and adjacent to the back of the multi-port RJ-jack housing;

at least one shared communications processor mounted on said circuit board on a first side thereof and connected to said plurality of communications ports for processing inbound and outbound communications signals so that the signals are shared amount the plurality of communications ports; and at least one EMI generating device positioned on a second side of said circuit board opposite the first side.

21. The RJ-jack housing according to claim 20 wherein said multi-port RJ-jack housing has a front and a back; wherein the recesses extend inwardly from the front of the multi-port RJ-jack housing; and wherein the circuit board extends across the back of the multi-port RJ-jack housing.

22. The RJ-jack housing according to claim 20 wherein said at least one shared communications processor comprises means for communications with two or more of said communications ports.

23. The RJ-jack housing according to claim 20 wherein said at least one shared communications processor comprises a plurality of shared communications processors all mounted on the first side of the circuit board.

24. The RJ-jack housing according to claim 23 wherein each of said plurality of shared communications processors is connected to two or more of said communications ports.

25. The RJ-jack housing according to claim 23 further comprising a communications repeater bus on said circuit board interconnecting said plurality of shared communications processors.

26. The RJ-jack housing according to claim 20 wherein two or more of the plurality of recesses are positioned in side-by-side relation.

27. The RJ-jack housing according to claim 20 wherein the plurality of recesses are arranged in two tiers, with each tier comprising two or more recesses arranged in side-by-side relation.

28. The RJ-jack according to claim 20 wherein said at least one shared communications processor comprises a respective shared communication processor for each group of four communications ports.

29. The RJ-jack housing according to claim 20 wherein said at least one shared communications processor comprises a plurality of transceivers for a corresponding group of communications ports.

30. The RJ-jack housing according to claim 20 further comprising an electrically conductive layer on outer surface portions of said multi-port RJ-jack housing defining an external EMI shield.

31. The RJ-jack housing according to claim 30 wherein said first internal EMI shield is electrically connected to said external EMI shield.

32. The RJ-Jack housing according to claim 20 wherein said at least one EMI generating device comprises at least one magnetic device.

33. The RJ-jack housing according to claim 20 wherein each of said communications ports is compatible with an RJ-45 jack.

34. An RJ-jack housing comprising;

a multi-port RJ-jack housing including portions defining a plurality of recesses extending inwardly for receiving respective mating plugs therein, the recesses being arranged in two tiers with each tier comprising two or more recesses arranged in side-by-side relation;

signal connector means within each of the recesses and defining a respective plurality of communications ports, each communications ports for establishing inbound and outbound signal paths with a respective mating plug;

a circuit board within, parallel, and adjacent to the back of said multi-port RJ-jack housing; and at least one shared communications processor mounted on said circuit board and connected to said plurality of communications ports for processing inbound and outbound communications signals so that the signals are shared among the plurality of communications ports.

35. The RJ-jack housing according to claim 34 wherein said multi-port RJ-jack housing has a front and a back; wherein the recesses extend inwardly from the front of the multi-port RJ-jack housing; and wherein the circuit board extends across the back of the multi-port RJ-jack housing.

36. The RJ-jack housing according to claim 34 wherein said at least one shared communications processor comprises means for communicating with two or more of said communications ports.

37. The RJ-jack housing according to claim 34 wherein said at least one shared communications processor comprises a plurality of shared communications processors.

38. The RJ-jack housing according to claim 37 wherein each of said plurality of shared communications processors is connected to two or more of said communications ports.

39. The RJ-jack housing according to claim 37 further comprising a communications repeater bus on said circuit board interconnecting said plurality of shared communications processors.

40. The RJ-jack housing according to claim 34 wherein said at least one shared communications processor comprises a respective shared communication processor for each group of four communications ports.

41. The RJ-jack housing according to claim 34 wherein said at least one shared communications processor comprises a plurality of transceivers for a corresponding group of communications ports.

42. The RJ-jack housing according to claim 34 wherein said circuit board comprises an electrically conductive layer defining a first internal electromagnetic interference (EMI) shield.

43. The RJ-jack housing according to claim 42 wherein said at least one shared communications processor comprises a plurality of shared communications processors all positioned on a first side of said circuit board.

44. The RJ-jack housing according to claim 42 further comprising a electrically conductive layer on outer surface portions of said multi-port RJ-jack housing defining an external EMI shield.

45. The RJ-jack housing according to claim 44 wherein said first internal EMI shield is electrically connected to said external EMI shield.

46. The RJ-jack housing according to claim 43 further comprising at least one EMI generating device positioned on a second side of said circuit board opposite the first side.

47. The RJ-jack housing according to claim 46 wherein said at lease one EMI generating device comprises at least one magnetic device.

48. The RJ-jack housing according to claim 34 wherein each of said communications ports is compatible with an RJ-45 jack.

49. The RJ-jack housing according to claim 34 wherein said signal connector means comprises a plurality of electrical contacts.

50. The RJ-jack housing according to claim 34 wherein said signal connector means comprises:

an optical detector for inbound optical signals; and an optical emitter for outbound optical signals.

51. A method for making an RJ-jack housing comprising a multi-port RJ-jack housing having a front and a back, and including portions defining a plurality of recesses extending inwardly from the front for receiving respective mating plugs therein, the method comprising the steps of:

positioning signal connector means within each of the recesses and defining a respective plurality of communications ports, each communications port for establishing inbound and outbound signal paths with a respective mating plug;

mounting at least one shared communications processor on a circuit board and connected to said plurality of communications ports for processing inbound and outbound communications signals so that the signals are shared among the plurality of communications ports; and positioning the circuit board within, parallel, and adjacent to the back of said multi-port RJ-jack housing.

52. The method according to claim 51 wherein the step of mounting at least one shared communications processor comprises mounting a plurality of communications processors.

53. The method according to claim 52 further comprising the step of providing a communications repeater bus on said circuit board interconnecting said plurality of shared communications processors.

54. The method according to claim 51 wherein said at least one shared communications processor comprises an integrated circuit.

55. The method according to claim 51 further comprising the step of providing an electrically conductive layer for said circuit board and defining a first internal electromagnetic interference (EMI) shield.

56. The method according to claim 55 wherein the step of mounting said at least one shared communications processor comprises mounting a plurality of communications processors all on a first side of said circuit board.

57. The method according to claim 56 further comprising the step of mounting at least one EMI generating device on a second side of said circuit board opposite the first side.

58. A method according to claim 57 wherein said at least one EMI generating device comprises at least one magnetic device.

59. The method according to claim 51 further comprising the step of providing an eclectically conductive layer on outer surface portions of said multi-port RJ-jack housing defining an external EMI shield.

60. The method according to claim 51 wherein each of said communications ports is compatible with an RJ-45 jack.

61. The method according to claim 51 wherein the step of providing signal connector means comprises providing a plurality of electrical contacts.

62. The method according to claim 51 wherein the step of providing signal connector means comprises providing:

an optical detector for inbound optical signals; and an optical emitter for outbound optical signals.

* * * * *